US012809996B2

(12) United States Patent
York et al.

(10) Patent No.: US 12,809,996 B2
(45) Date of Patent: Nov. 24, 2026

(54) CLOUD CONFIDENTIAL TELEMETRY EXPORT

(71) Applicant: Google LLC, Mountain View, CA (US)

(72) Inventors: Justin York, Cypress, TX (US); Jerome Glisse, Sunnyvale, CA (US); Andrew Price, Cupertino, CA (US)

(73) Assignee: Google LLC, Mountain View, CA (US)

( * ) Notice: Subject to any disclaimer, the term of this patent is extended or adjusted under 35 U.S.C. 154(b) by 93 days.

(21) Appl. No.: 18/392,808

(22) Filed: Dec. 21, 2023

(65) Prior Publication Data

US 2025/0209185 A1 Jun. 26, 2025

(51) Int. Cl.
*G06F 21/60* (2013.01)
*G06F 21/62* (2013.01)

(52) U.S. Cl.
CPC .......... *G06F 21/602* (2013.01); *G06F 21/604* (2013.01); *G06F 21/6209* (2013.01)

(58) Field of Classification Search
CPC ................. G06F 21/602; G06F 21/604; G06F 21/6209
See application file for complete search history.

(56) References Cited

U.S. PATENT DOCUMENTS

| | | | | |
|---|---|---|---|---|
| 9,043,602 | B1 * | 5/2015 | Krieger | H04W 12/06 713/181 |
| 9,628,447 | B2 * | 4/2017 | Durand | G06F 21/10 |
| 10,212,147 | B2 | 2/2019 | Buendgen et al. | |
| 2002/0176292 | A1 * | 11/2002 | Akasaki | G11C 7/1039 365/200 |
| 2015/0264024 | A1 | 9/2015 | Frank | |
| 2017/0118282 | A1 * | 4/2017 | Lee | H04L 67/61 |
| 2020/0173679 | A1 * | 6/2020 | O'Reilly | F24F 11/65 |
| 2022/0060455 | A1 * | 2/2022 | Rosenstein | H04L 9/0894 |
| 2023/0133110 | A1 * | 5/2023 | Viclizki | G06N 20/20 726/23 |
| 2023/0188319 | A1 | 6/2023 | Froelicher et al. | |

* cited by examiner

*Primary Examiner* — Ayoub Alata
(74) *Attorney, Agent, or Firm* — Lowenstein Sandler LLP

(57) ABSTRACT

A system can include a memory and one or more processing devices coupled to the first memory and configured to perform operations that include causing, using an encrypted application programming interface (API) call, a shared secret to a workload-specific device in a cloud computing environment; receiving encrypted telemetry data of the workload-specific device; decrypting, using the shared secret, the encrypted telemetry data; determining updated configuration data for the workload-specific device based on the decrypted telemetry data; and causing the updated configuration data in an encrypted state to be provided to the workload-specific device. The updated configuration data, when in a decrypted state, may be applicable to the workload-specific device to modify operation of the workload-specific device.

19 Claims, 11 Drawing Sheets

200

900

CLOUD CONFIDENTIAL TELEMETRY EXPORT

TECHNICAL FIELD

The instant specification generally relates to cloud computing. More specifically, the instant specification relates to cloud confidential telemetry export.

BACKGROUND

Cloud computing includes network-based computing in which collections of computing devices (e.g., servers, processing units, data storage devices) and software (e.g., computer programs, database tools) provide computational resources and data storage to remote end users. Typically, cloud providers offer some portion of the devices and software as a cloud computing environment to the cloud provider's customers. However, the cloud provider may have access to data provided to the cloud environment by the customer end users or may have access to device telemetry data.

SUMMARY

Disclosed herein are systems and methods for cloud confidential telemetry export. A cloud computing environment can include an end user tenant, which may include various computing instances and devices controlled by an end user of the environment, including a device configuration manager and one or more workload-specific devices. These computing instances and devices can include confidential computing technology that can prevent the cloud provider or third parties from accessing certain operations or data on these computing devices and instances. The workload-specific devices may execute workloads as directed by the end user. Execution of the workload-specific devices can generate telemetry data. The workload-specific devices may encrypt their telemetry data using a shared secret, such as an encryption key, which may be distributed to the device configuration manager and the one or more workload-specific devices without the cloud provider being able to access the shared secret. The workload-specific devices may cause the encrypted telemetry data to be provided to the device configuration manager. The device configuration manager may analyze the telemetry data and generate updated configuration data for the workload-specific devices that cause the workload-specific devices to operate more efficiently when executing their workloads. The device configuration manager may encrypt the updated configuration data and may send the encrypted updated configuration data to the one or more workload-specific devices. The one or more workload-specific devices may decrypt the updated configuration data and apply it, which may cause the one or more workload-specific devices to operate more efficiently. Because the telemetry data and updated configuration data are encrypted, and because the computing instances and devices implement confidential computing technology, the cloud provider may not be able to access the telemetry data or updated configuration data even though these data are located in the cloud computing environment. This may help the end user comply with data privacy requirements and regulations and may help keep proprietary device configurations confidential.

In one implementation, disclosed is a system that includes a first memory and one or more first processing devices coupled to the first memory. The one or more first processing devices are configured to perform operations. The operations include causing, using an encrypted application programming interface (API) call, a shared secret to be provided to a workload-specific device in a cloud computing environment. The operations further include receiving encrypted telemetry data of the workload-specific device. The operations further include decrypting, using the shared secret, the encrypted telemetry data. The operations further include determining updated configuration data for the workload-specific device based on the decrypted telemetry data. The operations further include causing the updated configuration data in an encrypted state to be provided to the workload-specific device. The updated configuration data, when in a decrypted state, may be applicable to the workload-specific device to modify the operation of the workload-specific device.

In another implementation, disclosed is another system. The system includes an integrated circuit, a memory, and one or more processing devices coupled to the memory. The one or more processing devices are configured to perform operations. The operations include receiving at least one shared secret provided by a device configuration manager in a cloud computing environment. The operations further include generating telemetry data during execution of the integrated circuit. The operations further include encrypting, using the at least one shared secret, the telemetry data. The operations further include providing the encrypted telemetry data for storage in a telemetry data store accessible to the device configuration manager. The operations further include receiving encrypted updated configuration data generated by the device configuration manager for the integrated circuit. The operations further include decrypting, using the at least one shared secret, the updated configuration data. The operations further include applying the decrypted updated configuration data to the integrated circuit to modify the operation of the integrated circuit.

In another implementation, disclosed is a method. The method includes receiving a first shared secret provided by a cloud provider management device in a cloud computing environment. The method further includes generating telemetry data during execution of a workload-specific device. The method further includes encrypting, using the first shared secret, the telemetry data. The method further includes providing the encrypted telemetry data for storage in a telemetry data store accessible by the cloud provider management device. The method further includes receiving updated configuration data for the workload-specific device. The method further includes applying the updated configuration data to the workload-specific device to modify operation of the workload-specific device.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
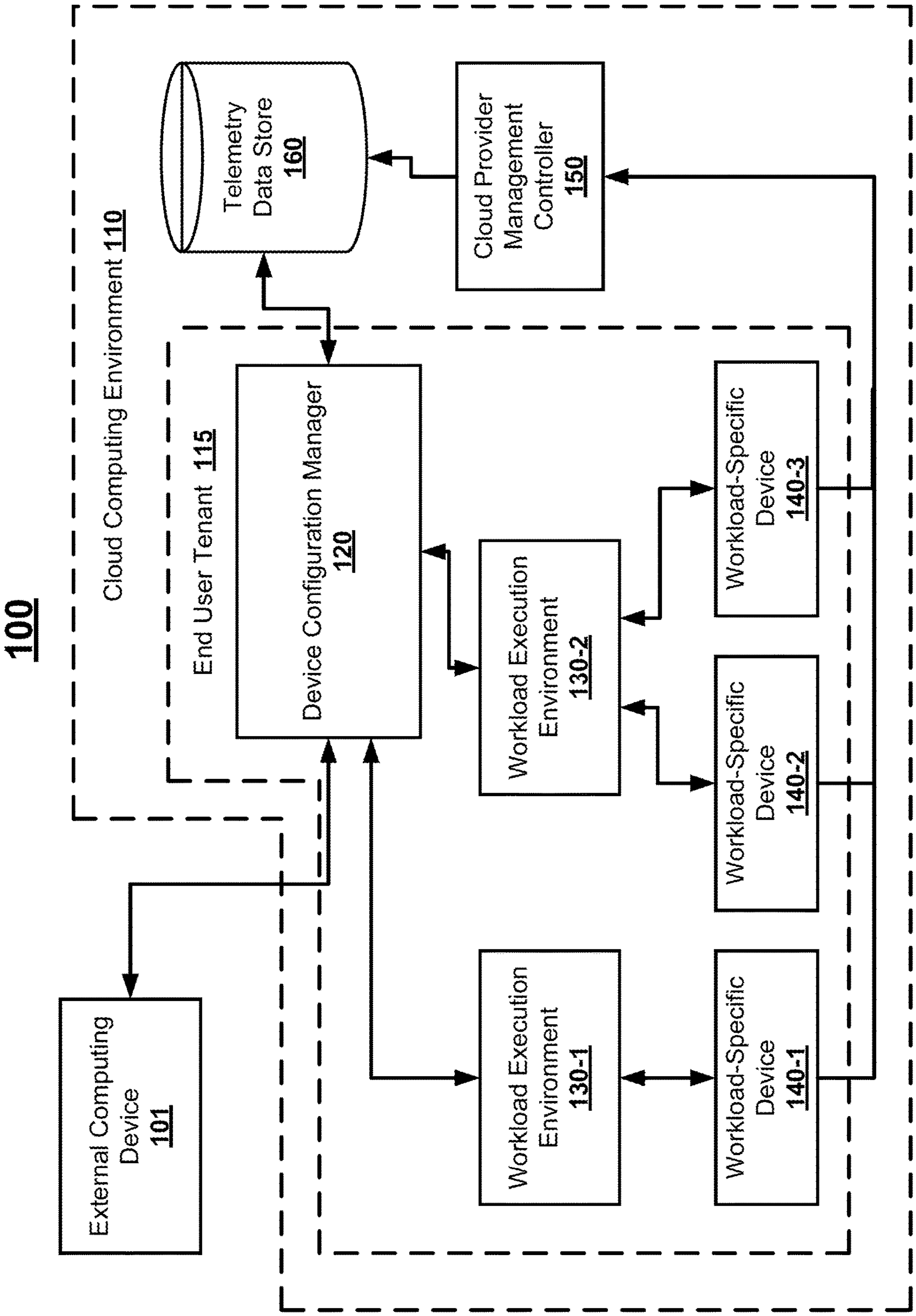
FIG. 1 schematically illustrates an example system for cloud confidential telemetry export in which selected aspects of the present disclosure may be implemented, in accordance with various embodiments.

A cloud provider may provide a cloud computing environment to a customer end user. The cloud computing environment may include one or more cloud computing devices (or portions of cloud computing devices), which can include servers, virtual machines (VMs), or other types of cloud computing devices. The cloud provider may allow an end user to utilize the cloud computing environment to perform computational tasks.

One type of computing device or portion of a computing device an end user may be interested in using in a cloud computing environment is a workload-specific device. A workload-specific device may include a computing device that performs computationally intensive operations, specialized operations, or operations specific to a task or computing workload. Example workload-specific devices can include an application-specific integrated circuit (ASIC), a graphic processing unit (GPU), or a central processing unit. Example workloads that can execute on a workload-specific device can include executing an artificial intelligence (AI) model. Fine-tuning a workload-specific device, or fine-tuning execution aspects of the workload-specific device, can help the workload-specific device run more efficiently or execute the workload more efficiently. A workload-specific device properly configured for a given workload can be the difference between success and failure. Telemetry data of a workload-specific device can be used to help fine-tune the device. Telemetry data includes data regarding metrics of the workload-specific device during execution. Telemetry data can include microprocessor usage data, memory usage data, temperature data, or power consumption data regarding the workload-specific device.

Cloud computing environment end users often desire that the cloud provider not have access to the end users' data that is stored or processed in the cloud environment. Similarly, the end users usually do not want the cloud provider to have access to the end user's workload-specific device telemetry data, execution attributes, configurations, aspects, etc. This desire for confidentiality from the cloud provider often stems from business or regulatory requirements that govern privacy (e.g., healthcare data privacy laws and regulations) or from the end users' desire to keep proprietary data (including the configurations of the workload-specific device) confidential.

Some cloud providers offer cloud computing environments that use confidential computing. Confidential computing includes providing a hardware-based trusted execution environment (TEE) within a processing device (e.g., a central processing unit (CPU)) of a computing device. The TEE may include a secure enclave within that is isolated from data and hardware outside of the TEE, making the data and processes within the TEE not directly accessible to the operating system or other software of the computing device that includes the processing device. The TEE may be secured using embedded encryption keys, and embedded attestation operations may prevent access to those keys except for authorized application code. Attempts by code that is not authorized may result in denial of the keys to the code. Confidential computing may include the TEE receiving encrypted data, the TEE using the encryption keys to decrypt the encrypted data, the TEE processing the unencrypted data using authorized code, the TEE encrypting the data resulting from the processing, and the TEE outputting the encrypted data from the TEE. In this manner, in some instances, encrypted data may only be processed in the TEE where it is isolated and secure from other portions of the computing device, including the operation system of the device.

However, this confidential computing technology and its use of the embedded encryption keys not only prevents the cloud provider from accessing the confidential data and workload-specific device configurations but can also prevent the end user from accessing these confidential data and configurations. This prevents end users from fine-tuning the workload-specific devices.

Aspects and implementations of the present disclosure address the above deficiencies, among others, by providing a cloud computing environment that allows a computing instance associated with an end user of the cloud computing environment to collect and analyze telemetry data from a workload-specific device in the environment, generate updated configuration data for the workload-specific devices, and cause the application of the updated configuration data to the workload-specific device to fine tune the workload-specific devices, all while keeping the telemetry and configuration data confidential from the cloud provider of the cloud computing environment.

A user device of the end user of the cloud computing environment can send a shared secret to various computing devices in the environment (including workload-specific devices) using encrypted application programming interface (API) calls. The shared secret can include an encryption key and can be stored in a portion of the computing device that is not accessible to (confidential from) the cloud provider. The workload-specific device can execute a workload and generate telemetry data. The workload-specific device can use the shared secret to encrypt the telemetry data. The workload-specific device can then send the encrypted telemetry data to a telemetry data store, which may be in the cloud computing environment or may be external to it. Because the telemetry data is encrypted, the cloud provider and other parties without the shared secret cannot decrypt the telemetry data and view the telemetry data.

A device configuration manager in the cloud environment can receive the encrypted telemetry data. The device configuration manager can have access to the shared secret and can use it to decrypt the encrypted telemetry data. The device configuration manager can then perform data analysis or other data analytics operations on the telemetry data in order to gain insights from the telemetry data and determine updated configurations for the workload-specific devices that would fine tune the workload-specific devices and execute workloads more efficiently. The device configuration manager can generate the updated configuration data, encrypt it using the shared secret, and cause the encrypted updated configuration data to be received by the workload-specific devices. The workload-specific devices can use the shared secret to decrypt the updated configuration data and apply the configuration data to modify the operation of the workload-specific devices so that the workload-specific devices operate more efficiently.

In some implementations, similar systems, technologies, methods, or techniques may help keep telemetry data or other cloud provider information that may be present on a workload-specific device confidential from end users of the cloud computing environment. These systems or technologies can include the cloud provider using a shared secret to encrypt telemetry data of a workload-specific device so that an end user of the workload-specific device cannot access the telemetry data. The workload-specific device may send the encrypted telemetry data to a telemetry data store, and the telemetry data store may pass the encrypted telemetry data to a cloud provider management device. The cloud provider management device may select which telemetry data to decrypt and provide to an end user.

In addition, some benefits of the present disclosure may provide a technical effect caused by or resulting from a technical solution to a technical problem. For example, one technical problem may relate to the inability of the cloud computing environment end user to keep telemetry data or workload-specific device configuration data confidential from the cloud provider or from other users of the cloud computing environment. In some cases, the cloud provider or the cloud provider's other customers may be competitors of the end user. Furthermore, the user may be required to keep some of the telemetry data or workload-specific device configuration data confidential to comply with business or regulatory requirements. One of the technical solutions to the technical problem may include using a shared secret at various computing devices in a cloud computing environment to encrypt the telemetry data and workload-specific device configuration data to keep the data confidential from the cloud provider. As a consequence, the inability to keep the telemetry data and workload configuration data confidential from the cloud provider in the cloud computing environment is eliminated.

Another technical problem may relate to the inability of the end user to access the telemetry data where the cloud computing environment includes confidential computing technology. One of the technical solutions to the technical problem may include using a shared secret accessible to a user device of the end user in a confidential portion of various computing devices in the cloud computing environment to be able to collect and encrypt the telemetry data so the end user has access to the telemetry data. As a consequence, the inability of the end user to access the telemetry data is eliminated.

Another technical problem may relate to significant use of processing resources, memory usage resources, or other computing resources at a workload-specific device in the cloud computing environment when executing a workload. Even if an end user device were able to collect telemetry data from the workload-specific devices, such data would be visible to the cloud provider, and, as discussed above, this may not be desirable for the end user due to business or regulatory concerns. One of the technical solutions to the technical problem may include analyzing the telemetry of the workload-specific device to generate updated configuration data and securely sending the updated configuration data to the workload-specific device so the cloud provider cannot decrypt the configuration data. As a consequence, usage of computing resources by the workload-specific device is reduced while still keeping the telemetry data and updated configuration data confidential from the cloud provider.

FIG. 1 is a schematic block diagram illustrating one embodiment of a system 100 for cloud confidential telemetry export. The system 100 may include an external computing device 101 and a cloud computing environment 110. The cloud computing environment 110 may provide end users with sets of resources (referred to as "end user tenancies") 115. Each end user tenancy 115 may include one or more device configuration managers 120; one or more workload execution environments 130-1, 130-2; and one or more workload-specific devices 140-1, . . . , 140-3. The cloud computing environment 110 may also include a cloud provider management controller 150 and a telemetry data store 160.

In some implementations, the external computing device 101 may include a computing device operated by an end user of the cloud computing environment 110. In one or more implementations, a computing device may include a physical computing device or may include a virtualized component, such as a virtual machine (VM) or a container. A computing device may include an instance of a computing device. An instance of a computing device may include a spun-up instance that may not be specific to any computing device. In some implementations, the cloud computing environment may be configured to allow the end user to use a portion of a computing device (e.g., only certain hardware, software, or other computer system resources). In some implementations, a VM may include a system virtual machine, which may include a VM that emulates an entire physical computing device. A VM can include a process virtual machine, which may include a VM that emulates an application or some other software. A container may include a computing environment that logically surrounds one or more software applications independently of other applications executing in the cloud computing environment.

In one implementation, the external computing device 101 may be external in the sense that it is external from (e.g., connected via a network to) the cloud computing environment 110. The end user may use the external computing device 101 to access the cloud computing environment 110, send data to the cloud computing environment 110, or receive data from the cloud computing environment 110. As an example, the external computing device 101 may use a web browser, a command-line interface, or some other software application in data communication with the cloud computing environment 110 to interact with the cloud computing environment 110.

In some implementations, the cloud computing environment 110 may include one or more cloud computing devices (or portions of cloud computing devices) provided by a cloud provider to an end user. In one implementation, a cloud provider may include an entity that provides end user tenancies 115 to one or more end users. The cloud computing environment 110 may include one or more computing devices that oversee or manage the cloud computing environment 110, for example, providing access to an end user tenancy 115 to an end user, providing security for the cloud computing environment 110, tracking end user usage of computing resources to determine expenses for the end user, etc. The cloud computing environment may include a private cloud, a public cloud, or a hybrid cloud. The cloud computing environment may provide infrastructure-as-a-service (IaaS), platform-as-a-service (PaaS), software-as-a-service (SaaS), or serverless computing.

In one implementation, an end user tenancy 115 of the cloud computing environment 110 may be associated with an end user of the cloud computing environment 110 and may perform computational tasks for the end user. An end user tenancy 115 may include a portion of the cloud computing environment 110 that is logically isolated from other end user tenancies 115 and may provide a logical space for the end user's data or software applications.

In one or more implementations, a device configuration manager 120 may include a computing device configured to assist the end user in controlling other portions of the cloud computing environment 110, such as a workload execution environment 130 or a workload-specific device 140. The device configuration manager 120 may be configured to receive telemetry data (e.g., from the telemetry data store 160) and analyze the telemetry data. The device configuration manager 120 may be configured to generate updated configuration data for one or more of the workload-specific devices 140-1, . . . , 140-3 or receive updated configuration data (e.g., from the external computing device 101). The device configuration manager 120 may include a component that implements confidential computing technology.

In some implementations, a workload execution environment 130 may include a computing device configured to manage one or more workload-specific devices 140. Managing a workload-specific device 140 may include starting, stopping, or pausing execution of the workload-specific device 140; sending data to a workload-specific device 140 (e.g., an AI model to be executed on the workload-specific device 140); receiving data from the workload-specific device 140 (e.g., results from an inference calculation of an AI model performed on the workload-specific device 140); or other actions. As can be seen in FIG. 1, a first workload execution environment 130-1 may manage one workload-specific device 130-1, and a second workload execution environment 130-2 may manage multiple workload-specific devices 140-2, 140-3. In some cases, a workload execution environment 130-1 may manage a certain type of workload-specific device 140. For example, the first workload execution environment 130-1 may manage ASIC-type workload-specific devices 140, and the second workload execution environment 130-2 may manage graphics processing unit (GPU)-type workload-specific devices 140.

In one implementation, a workload-specific device 140 may include a computing device configured to execute a computing workload. The workload-specific device 140 may include an integrated circuit, such as an ASIC, a field-programmable gate array (FPGA), a Tensor processing unit (TPU), or some other type of integrated circuit. The workload-specific device may include a processing device, such as a GPU, a central processing unit (CPU), a core of a CPU, or some other processing device. The workload-specific device 140 may include at least a portion of a computing device. A workload may include a computational task. Examples of a workload may include the execution of an AI model, the execution of another type of model (e.g., a physics-based model, a weather model, a mathematical model), or the execution of a computer simulation. A workload may include other types of computational tasks.

In some implementations, the workload-specific device 140 may generate telemetry data of the workload-specific device 140, for example, in response to executing the workload. The workload-specific device 140 may encrypt the telemetry data so the cloud provider cannot view the telemetry data. The workload-specific device 140 may have limited data storage capacity (because, for example, the purpose of the workload-specific device 140 may be to execute workloads and not to store data), thus, the workload-specific device 140 may send the encrypted telemetry data to another computing device for storage.

The cloud provider management controller 150 may include a computing device configured to collect encrypted telemetry data from the workload-specific devices 140-1, . . . , 140-3. The cloud provider management controller 150 may periodically send a request to a workload-specific device 140 for the workload-specific device 140 to send the cloud provider management controller 150 the encrypted telemetry data. In some cases, the workload-specific device 140 may send the encrypted telemetry data without receiving a request from the cloud provider management controller 150. The cloud provider management controller 150 may have limited data storage capacity (because, for example, the purpose of the cloud provider management controller 150 may be to collect encrypted telemetry data and perform other cloud provider-related tasks and not to store data), thus, the cloud provider management controller 150 may send the encrypted telemetry data to another computing device for storage.

In one or more embodiments, the telemetry data store 160 may include a computing device configured to store data. The telemetry data store 160 may include one or more storage devices (e.g., a hard disk drive (HDD), flash memory, etc.) or one or more data storage processes (e.g., a database, a file system, etc.) that may store the encrypted telemetry data. The telemetry data store 160 may send encrypted telemetry data to the device configuration manager 120. In some implementations, the device configuration manager 120 may send a request for the encrypted telemetry data to the telemetry data store 160. In certain implementations, the telemetry data store 160 may periodically send the encrypted telemetry data to the device configuration manager 120 without receiving a request for the encrypted telemetry data.

In some implementations, an end user of the cloud computing environment 110 may operate or control the device configuration manager 120, the one or more workload execution environments 130-1, 130-2, or the one or more workload-specific devices 140-1, . . . , 140-3. The device configuration manager 120, the one or more workload execution environments 130-1, 130-2, or the one or more workload-specific devices 140-1, . . . , 140-3 may execute on computing devices or other equipment owned or operated by the cloud provider. The cloud provider may operate or control the cloud provider management controller 150 or the telemetry data store 160.

While FIG. 1 depicts a single device configuration manager 120, the cloud computing environment 110 may include multiple device configuration managers 120. Similarly, the cloud computing environment 110 may include any number of workload execution environments 130 and any number of workload-specific devices 140. The one or more workload execution environments 130 may manage any number of workload-specific devices 140. Similarly, the cloud computing environment 110 may include any number of cloud provider management controllers 150 or any number of telemetry data stores 160. In some implementations, a telemetry data store 160 may not form part of the cloud computing environment 110 but may be located externally from the cloud computing environment 110 (e.g., the telemetry data store 160 may be provided by a third party that is not the cloud provider).

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2:
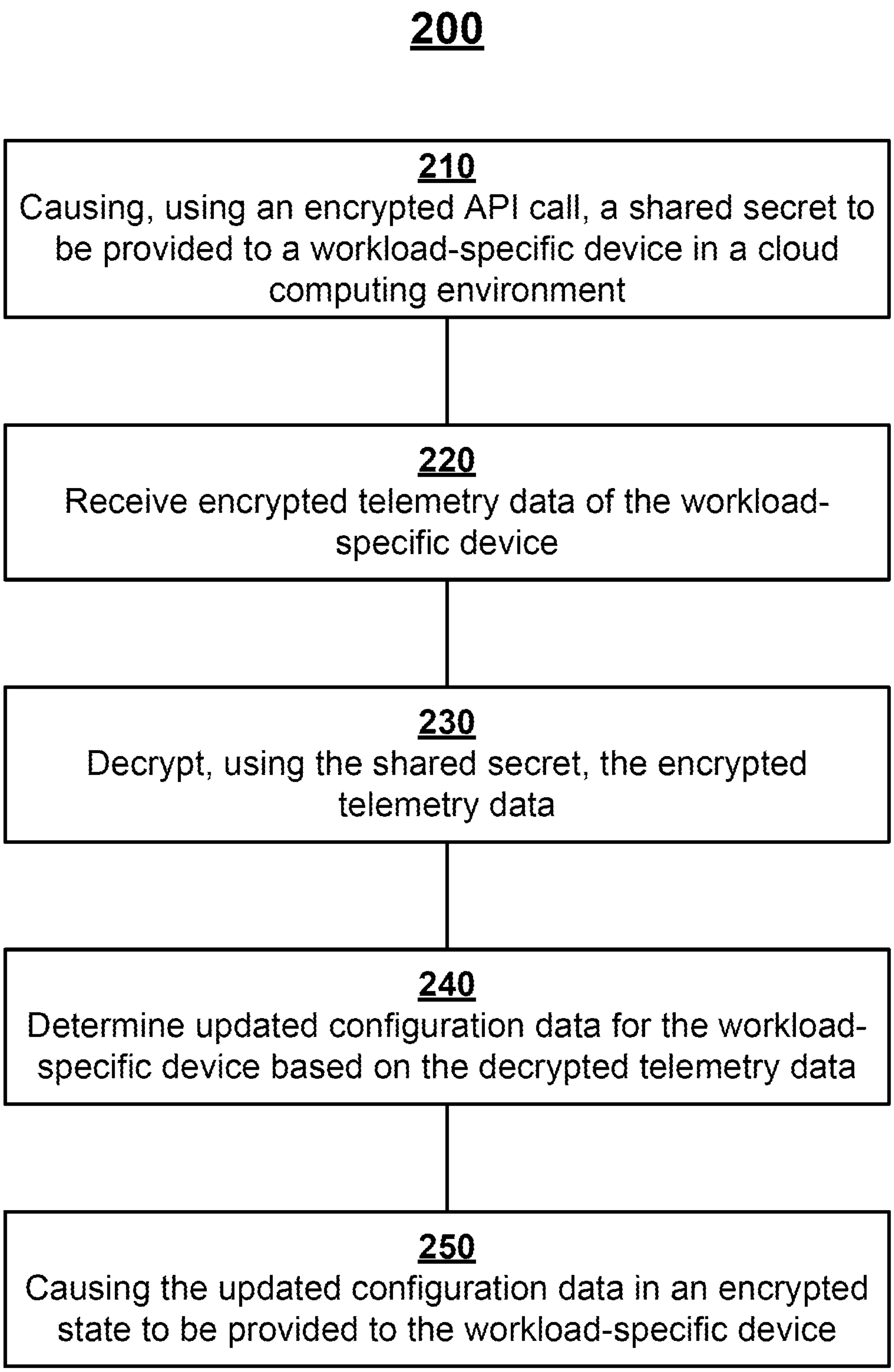
FIG. 2 depicts a flowchart illustrating an example method for practicing selected aspects of the present disclosure.

FIG. 2 is a flowchart illustrating one embodiment of a method 200 for cloud confidential telemetry export, in accordance with some implementations of the present disclosure. A processing device, having one or more CPUs, one or more GPUs, and/or one or more memory devices communicatively coupled to the CPU(s) and/or GPU(s) can perform the method 200 and/or each of their individual functions, routines, subroutines, or operations. In certain implementations, a single processing thread can perform the method 200. Alternatively, two or more processing threads can perform the method 200, each thread executing one or more individual functions, routines, subroutines, or operations of the methods. In an illustrative example, the processing threads implementing the method 200 can be synchronized (e.g., using semaphores, critical sections, and/or other thread synchronization mechanisms). Alternatively, the processing threads implementing the method 200 can be executed asynchronously with respect to each other. Various operations of the method 200 can be performed in a different (e.g., reversed) order compared with the order shown in FIG. 2. Some operations of the method 200 can be performed concurrently with other operations. Some operations can be optional. In some embodiments, the device configuration manager 120 may perform the method 200.

Block 210 of the method 200 can include causing, using an encrypted API call, a shared secret to be provided to a workload-specific device 140 in a cloud computing environment 110. The shared secret may include data that allows portions of the cloud computing environment 110 to encrypt and decrypt end user data to prevent the end user data from being viewed or decrypted by the cloud provider. The shared secret can include an encryption key. The encryption key can include a symmetric encryption key, an asymmetric encryption key (e.g., a public-private encryption key pair), or some other type of encryption key.

In one implementation, causing the shared secret to be provided to the workload-specific device 140 may include the device configuration manager 120 sending the shared secret to a workload execution environment 130 and the workload execution environment 130 sending the shared secret to a workload-specific device 140. The device configuration manager 120 may use an encrypted API call to communicate the shared secret to the workload execution environment 130, and the workload execution environment 130 may use a secure communications channel to communicate the shared secret to the workload-specific device 140. The secure communications channel may include a peripheral component interconnect express (PCIe) channel or some other secure communications channel that may prevent reading the shared secret while in transit over the channel.

Figure 3:
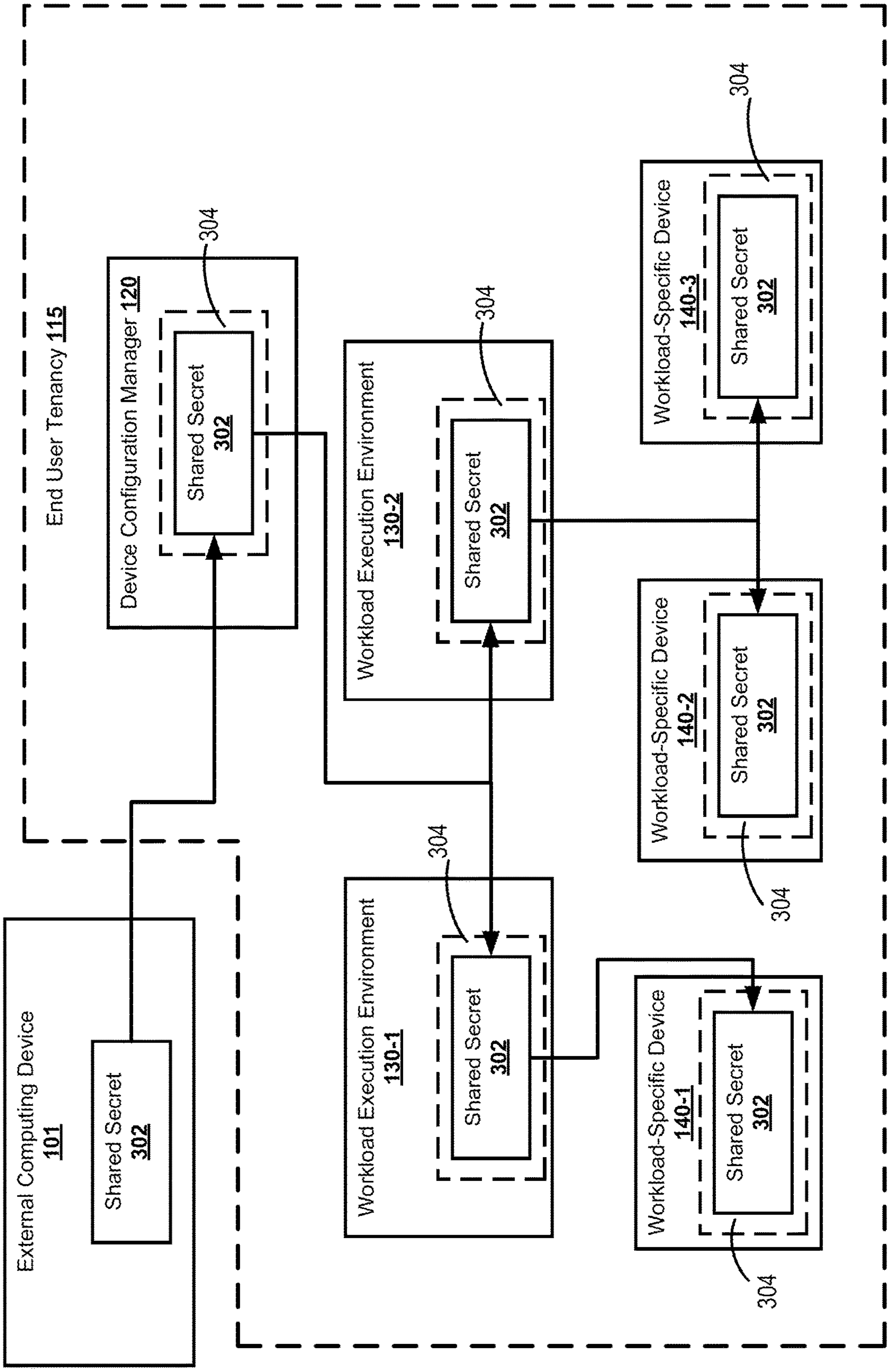
FIG. 3 schematically illustrates a portion of the example system of FIG. 1 in which selected aspects of the present disclosure may be implemented, in accordance with various embodiments.

FIG. 3 depicts one example implementation of block 210 of the method 200. As can be seen in FIG. 3, the external computing device 101 may include the shared secret 302. The external computing device 101 may generate the shared secret 302 and may use an encrypted API call to send the shared secret 302 to the device configuration manager 120. The device configuration manager 120 may store the shared secret 302 in a confidential computing environment 304 of the device configuration manager 120. The confidential computing environment 304 may include a TEE implemented by a processing device of a computing device that executes the device configuration manager 120.

The device configuration manager 120 may use an encrypted API call to send the shared secret 302 to the workload execution environments 130-1, 130-2. The workload execution environments 130-1, 130-2 may each store the shared secret 302 in their respective confidential computing environments 304. A confidential computing environment 304 of a workload execution environment may include a TEE implemented by a processing device of a computing device that executes the workload execution environment 130. The workload execution environments 130-1, 130-2 may send the shared secret 302 to their respective workload-specific devices 140-1, . . . , 140-3 over secure communications channels. The workload-specific devices 140-1, . . . , 140-3 may each store the shared secret 302 in their respective confidential computing environments 304. A confidential computing environment 304 of a workload-specific device may include a TEE implemented by a processing device of a computing device that executes the workload-specific device 140.

In some implementations, the shared secret 302 may include multiple shared secrets 302. The device configuration manager 120, the one or more workload execution environments 130, or the one or more workload-specific devices 140 may select which shared secret 302 of the multiple shared secrets 302 to use and may periodically rotate the currently selected shared secret 302 among the multiple shared secrets 302. In some implementations, the device configuration manager 120, the one or more workload execution environments 130, or the one or more workload-specific devices 140 may rotate the shared secret 302 in response to a predetermined time amount expiring. In other embodiments, the device configuration manager 120, the one or more workload execution environments 130, or the one or more workload-specific devices 140 may rotate the shared secret 302 in response to a device (e.g., the device configuration manager 120) sending a signal to the other the device configuration manager 120, the one or more workload execution environments 130, or the one or more workload-specific devices 140 to rotate the shared secret 302. In other implementations, a device (e.g., the external computing device 101) may periodically send a new shared secret 302 to be distributed to the device configuration manager 120, the one or more workload execution environments 130, or the one or more workload-specific devices 140.

In one embodiment, a workload-specific device 140 may execute a workload. As discussed above, executing a workload may include a computational task (e.g., executing an AI model, executing a mathematical model, executing a computer simulation, or performing some other type of computational task). The workload-specific device 140 may generate telemetry data in response to executing the workload.

In those instances where the description of implementations refers to AI models, it should be understood that an AI model can refer to a variety of AI models. For example, an AI model can include a machine learning model (MLM), such as an artificial neural network (ANN), which can include multiple nodes ("neurons") arranged in one or more layers, and a neuron may be connected to one or more neurons via one or more edges ("synapses"). The synapses may perpetuate a signal from one neuron to another, and a weight, bias, or other configuration of a neuron or synapse may adjust a value of the signal. The ANN can undergo training to adjust the weights or adjust other features of the ANN. Such training may include inputting data, and other information, into the ANN and adjusting the ANN's features in response to an output of the ANN. An ANN may include a deep learning ANN, which may include an ANN with a large number of neurons, synapses, or layers. An MLM may include another type of MLM, such as clustering, decision trees, Bayesian networks, or the like. An AI model may include a generative AI model (such as an LLM), an adversarial AI model, or other types of AI models.

In some implementations, telemetry data can include computing resource utilization data of the workload-specific device 140. Computer resource utilization data can include processing device usage data, microprocessor usage data, memory usage data, etc. Telemetry data can include a data path of the workload-specific device 140 or an error generated by the workload-specific device 140. Telemetry data can include a temperature reading of the workload-specific device 140, a power consumption reading of the workload-specific device 140, or a cache line miss of the workload-specific device 140. Telemetry data can include instruction store data or a computer architecture component counter. The telemetry data can include a clock setting of the workload-specific device 140, a voltage of the workload-specific device 140, or a utilization counter of the workload-specific device 140. If the workload-specific device 140 is a TPU, the telemetry data can include a trace event stream for optimizing a workload of the TPU. The telemetry data can include other types of data generated by or collected from the workload-specific device 140.

A workload-specific device 140 may encrypt its telemetry data using the shared secret 302 stored on the workload-specific device 140 and may send the encrypted telemetry data to another computing device to be stored. The encrypted telemetry data may not be accessible by the cloud provider, a malicious actor, or a third party. The encrypted telemetry data being not accessible may include the encrypted telemetry data being not decryptable by the cloud provider, a malicious actor, or a third party. Such parties may still have physical or logical access to the encrypted telemetry data, but they may not be able to read or otherwise access the telemetry data because it is encrypted.

Figure 4:
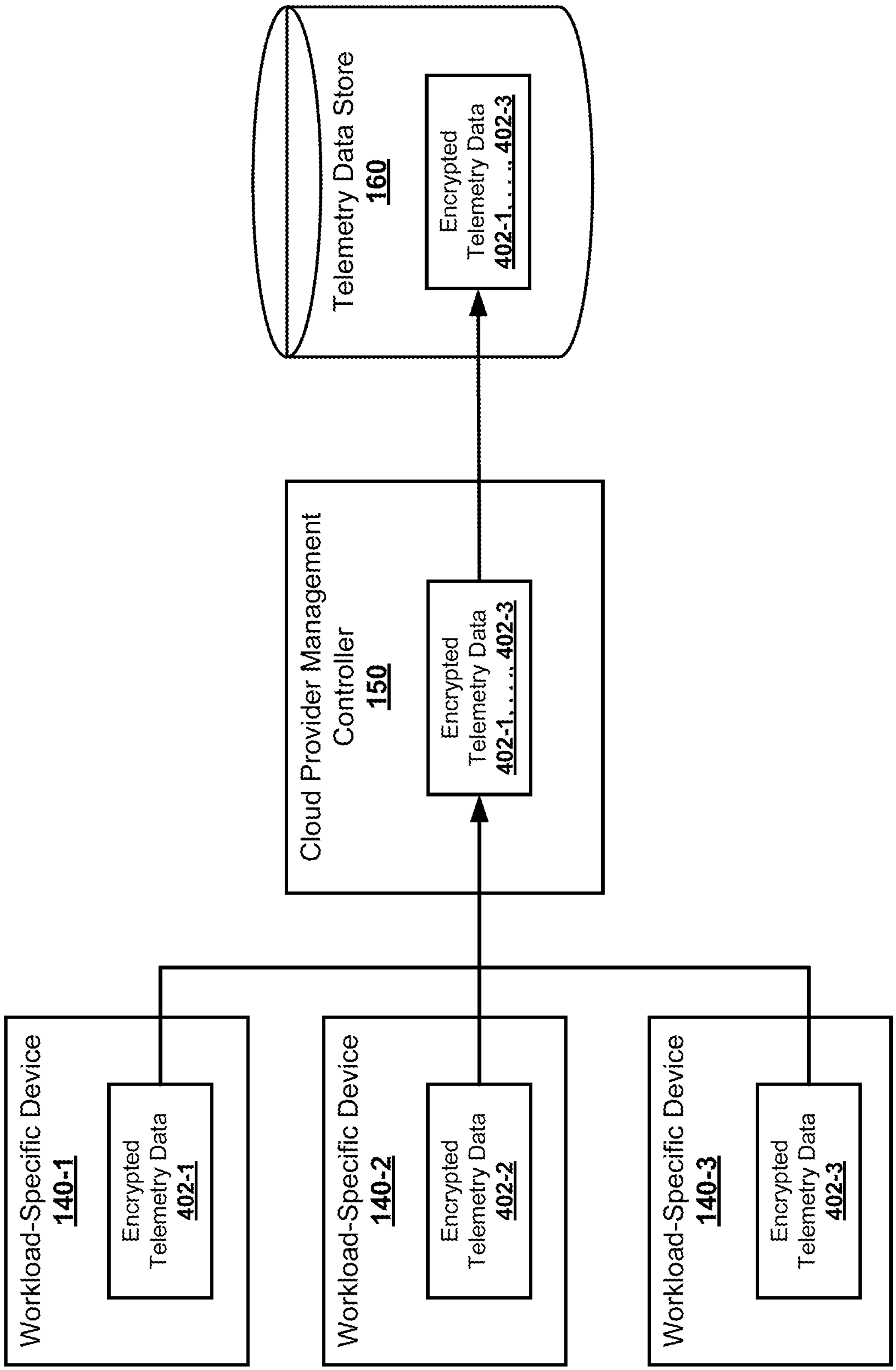
FIG. 4 schematically illustrates a portion of the example system of FIG. 1 in which selected aspects of the present disclosure may be implemented, in accordance with various embodiments.

As seen in FIG. 4, the workload-specific devices 140-1, . . . , 140-3 may send their respective pieces of encrypted telemetry data 402-1, . . . , 402-3 to the cloud provider management controller 150. The cloud provider management controller 150 may then send the encrypted telemetry data 402-1, . . . , 402-3 to the telemetry data store 160 for storage. A workload-specific device 140 may send its encrypted telemetry data 402 to the cloud provider management controller 150 in response to the data storage device(s) 306 of the workload-specific device 140 exceeding a threshold storage capacity, in response to completion of the execution of the workload that resulted in the generation or collection of the telemetry data, in response to a request from the cloud provider management controller 150, or in response to another event. The workload-specific device 140 may be configured to periodically send the encrypted telemetry data 402 it currently stores (e.g., every minute, hour, or some other amount of time). Similarly, in one or more embodiments, the cloud provider management controller 150 may send the encrypted telemetry data 402-1, . . . , 402-3 to the telemetry data store 160 in response to the data storage of the cloud provider management controller 150 exceeding a threshold storage capacity, in response to receiving a piece of encrypted telemetry data 402, in response to a request from the telemetry data store 160, or in response to another event. The cloud provider management controller 150 may be configured to periodically send the encrypted telemetry data 402-1, . . . , 402-3 it currently stores.

Figure 5:
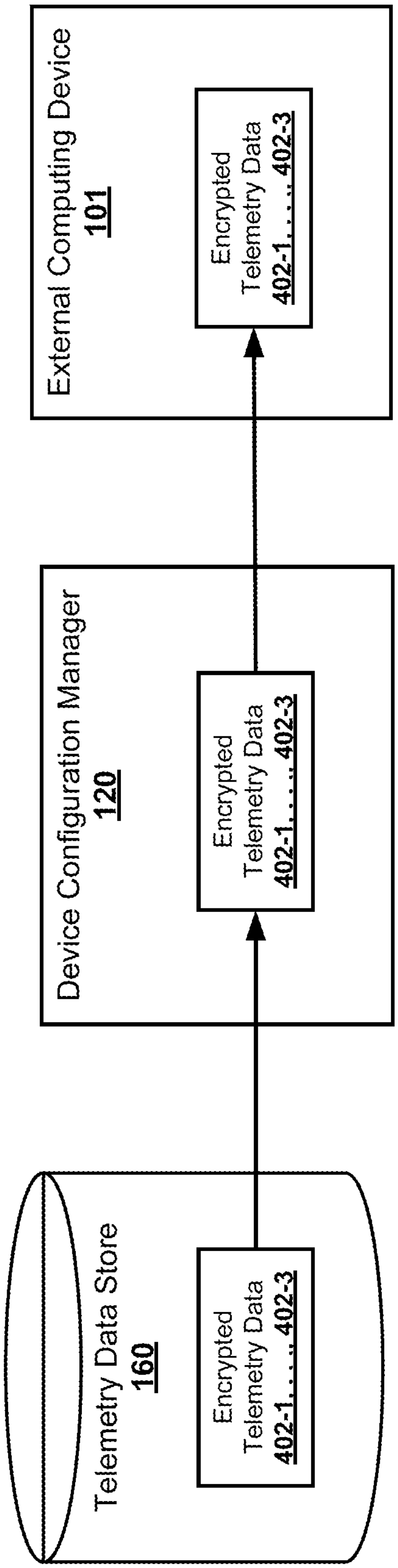
FIG. 5 schematically illustrates a portion of the example system of FIG. 1 in which selected aspects of the present disclosure may be implemented, in accordance with various embodiments.

Returning to FIG. 2, block 220 of the method 200 may include receiving the encrypted telemetry data 402-1, . . . , 402-3 of one or more workload-specific devices 140-1, . . . , 140-3. FIG. 5 depicts an example implementation of block 220. In one implementation, the device configuration manager 120 may receive the encrypted telemetry data 402-1, . . . , 402-3 from the telemetry data store 160. In some implementations, the external computing device 101 may receive the encrypted telemetry data 402-1, . . . , 402-3 from the device configuration manager 120. The different components of the system 100 may receive the encrypted telemetry data 402-1, . . . , 402-3 over a data network.

Block 230 may include decrypting, using the shared secret 302, the encrypted telemetry data 402-1, . . . , 402-3. Decrypting the encrypted telemetry data 402-1, . . . , 402-3 may include the device configuration manager 120 or the external computing device 101 decrypting the encrypted telemetry data 402-1, . . . , 402-3. In some implementations where the device configuration manager decrypts the encrypted telemetry data 402-1, . . . , 402-3, the decrypted telemetry data may be located in the confidential computing environment 304 of the device configuration manager 120. This may prevent the cloud provider from accessing the unencrypted telemetry data even though the telemetry data is located in the cloud computing environment 110.

Block 240 may include determining updated configuration data for a workload-specific device 140 based on the decrypted telemetry data. Determining the updated configuration data may occur on the device configuration manager 120 or on the external computing device 101. Determining the updated configuration data may include performing data analysis on the telemetry data and generating the updated configuration data based on one or more results of the data analysis. In some implementations, configuration data for a workload-specific device 140 may include device settings for the workload-specific device 140, memory timing data, a frequency of a component of the workload-specific device 140, or other data specifying one or more configurations of the workload-specific device 140. In one implementation, where the workload of the workload-specific device 140 includes the execution of an AI model, the configuration data may include a configuration of a parameter of the AI model. For example, where the AI model includes an ANN, the configuration data may include a number of layers of the ANN, the number of neurons in a layer, the connections between neurons, a weight or bias of a synapse or neuron, or some other ANN configuration.

Block 250 of the method 200 can include causing the updated configuration data in an encrypted state to be provided to a workload-specific device 140. The updated configuration data, when in a decrypted state, may be applicable to the workload-specific device 140 to modify the operation of the workload-specific device 140.

Figure 6:
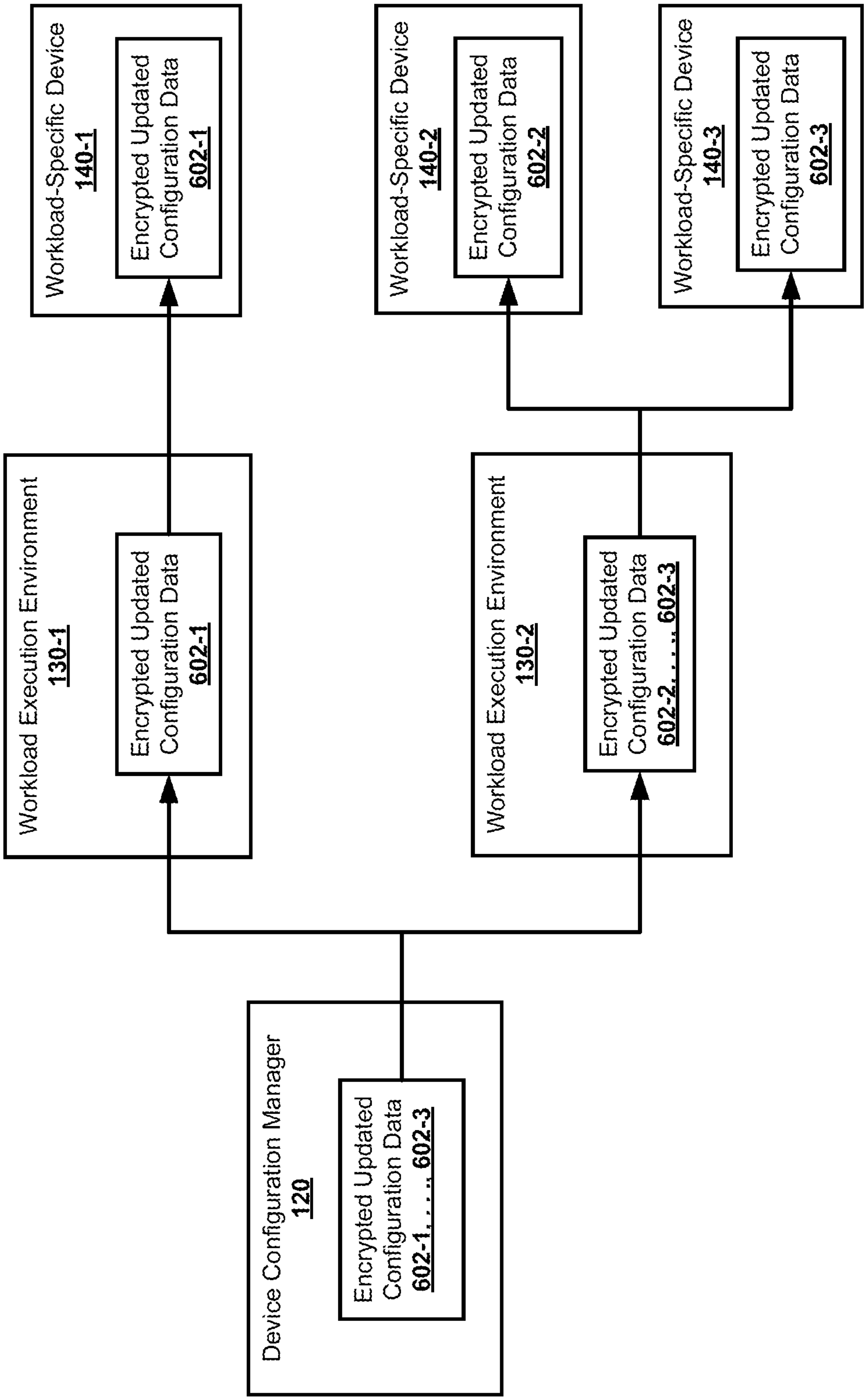
FIG. 6 schematically illustrates a portion of the example system of FIG. 1 in which selected aspects of the present disclosure may be implemented, in accordance with various embodiments.

FIG. 6 depicts an example implementation of block 250. The device configuration manager 120 has encrypted the updated configuration data to create encrypted updated configuration data 602-1, . . . , 602-3. Different pieces of the encrypted updated configuration data 602-1, . . . , 602-3 are applicable to different workload-specific devices 140-1, . . . , 140-3. In the example in FIG. 6, the first encrypted updated configuration data 602-1 may be applicable to the first workload-specific device 140-1, the second updated configuration data 602-2 may be applicable to the second workload-specific device 140-2, and the third updated configuration data 602-3 may be applicable to the third workload-specific device 140-3. The device configuration manager 120 may send the different portions of the encrypted updated configuration data 602-1, . . . , 602-3 to the workload execution environments 130-1, 130-2 that manage the different workload-specific devices 140-1, . . . , 140-3. For example, as seen in FIG. 6, the first workload execution environment 130-1, which manages the first workload-specific device 140-1, receives the encrypted updated configuration data 602-1 from the device configuration manager 120, and the second workload execution environment 130-2, which manages the second workload-specific device 140-2 and the third workload-specific device 140-3, receives the encrypted updated configuration data 602-2, 602-3. The workload execution environments 130-1, 130-2 may then send the received encrypted updated configuration data 602-1, . . . , 602-3 to the applicable workload-specific devices 140-1, . . . , 140-3.

In some implementations, different pieces of the encrypted updated configuration data 602-1, . . . , 602-3 may be the same or may be similar. This may be in response to some of the workload-specific devices 140-1, . . . , 140-3 being the same or similar type of workload-specific device 140 or performing the same or similar types of workloads. In one or more implementations, the encrypted updated configuration data 602 may include encrypted updated configuration data 602 for only a subset of the workload-specific devices 140-1, . . . , 140-3.

After a workload-specific device 140 receives its applicable encrypted updated configuration data 602, the workload-specific device 140 may use the shared secret 302 to decrypt the encrypted updated configuration data 602. The workload-specific device 140 may then apply the updated configuration data to modify the operation of the workload-specific device 140. Applying the updated configuration data may include replacing at least a portion of the workload-specific device's 140 current configuration data with at least a portion of the updated configuration data. Applying the updated configuration data may include modifying the workload-specific device's 140 current configuration data based on at least a portion of the updated configuration data.

Modifying the workload-specific device 140 may include modifying a memory timing of the workload-specific device 140 or modifying a frequency of a component of the workload-specific device 140. Modifying the workload-specific device 140 may include performing other types of modifications.

In one or more implementations, the end user that operates the device configuration manager 120 may desire to expose some of the unencrypted telemetry data to the cloud provider or to a third party. The end user may do this to allow the cloud provider or the third party to perform data analysis or other operations on the telemetry data. The data analysis or other operations performed by the cloud provider or the third party may not be possible using the device configuration manager 120 or a computing device operated by the end user (e.g., because the cloud provider's or third party's computing devices may be more powerful or because the cloud provider or third party has access to data analysis consultants that the end user does not have). The data analysis or other operations on the telemetry data performed by the cloud provider or the third party may generate updated configuration data.

In one implementation, exposing at least a portion of the unencrypted telemetry data to the cloud provider or a third party may include determining one or more portions of the telemetry data that are below a threshold level of sensitivity. The device configuration manager 120 may make the determination. The device configuration manager 120 may make the determination in response to user input (e.g., user input selecting the one or more portions of the telemetry data), in response to metadata associated with the one or more portions of the telemetry data (e.g., metadata indicating a level of sensitivity), or in response to some other action. The one or more portions of the telemetry data being below the threshold level of sensitivity may include the one or more portions of the telemetry data not belonging to a category of data restricted by laws, regulations, or business requirements (e.g., healthcare privacy laws and regulations). Exposing the at least a portion of the unencrypted telemetry data may include providing the one or more portions of the telemetry data in a decrypted state to the cloud provider or to the third party. Providing the telemetry data may include sending the telemetry data to a computing device operated by the cloud provider or the third party.

Figure 7:
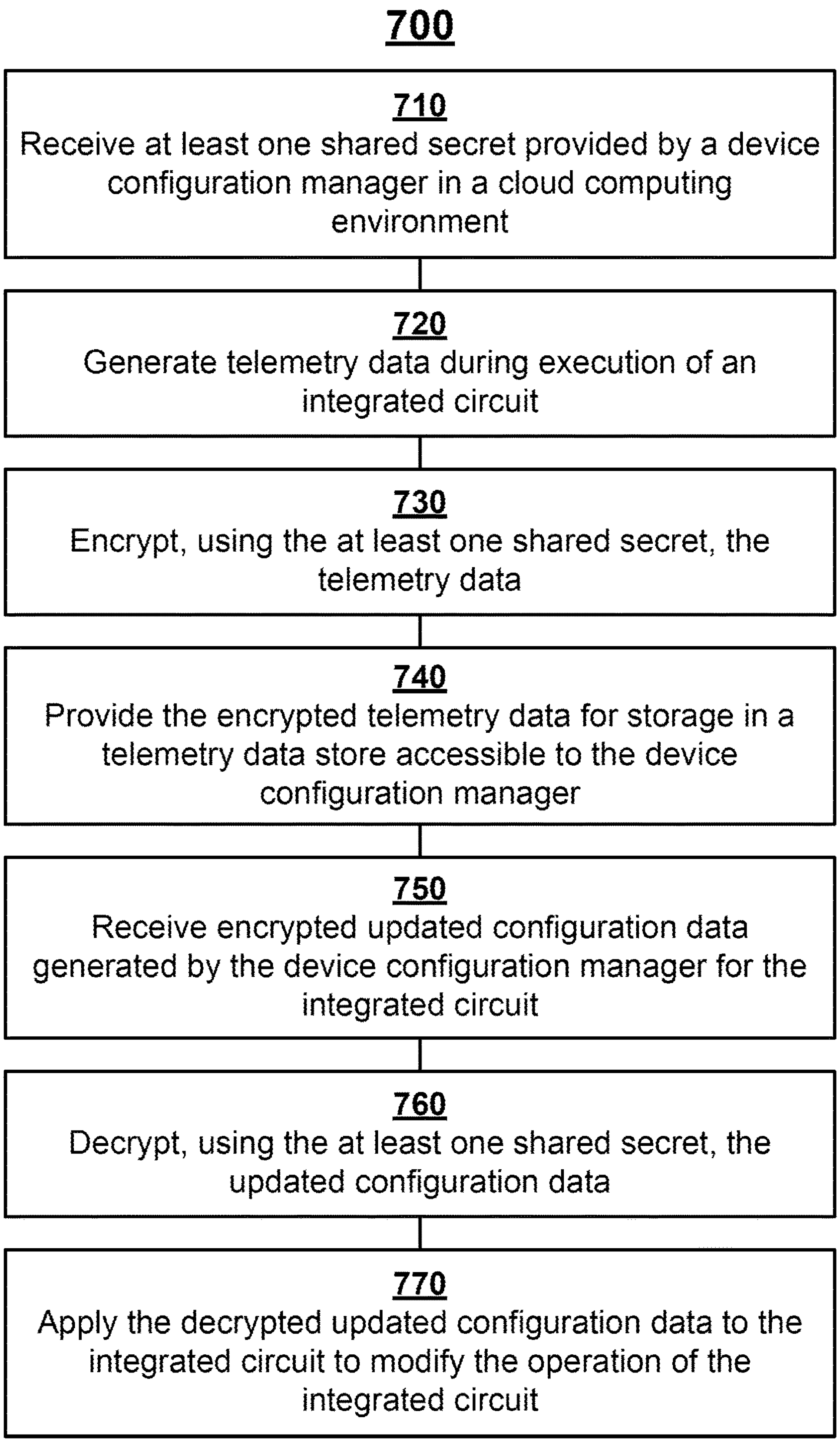
FIG. 7 depicts a flowchart illustrating another example method for practicing selected aspects of the present disclosure.

FIG. 7 is a flowchart illustrating one embodiment of a method 700 for cloud confidential telemetry export, in accordance with some implementations of the present disclosure. A processing device, having one or more CPUs, one or more GPUs, and/or one or more memory devices communicatively coupled to the CPU(s) and/or GPU(s) can perform the method 700 and/or each of their individual functions, routines, subroutines, or operations. In certain implementations, a single processing thread can perform the method 700. Alternatively, two or more processing threads can perform the method 700, each thread executing one or more individual functions, routines, subroutines, or operations of the methods. In an illustrative example, the processing threads implementing the method 700 can be synchronized (e.g., using semaphores, critical sections, and/or other thread synchronization mechanisms). Alternatively, the processing threads implementing the method 700 can be executed asynchronously with respect to each other. Various operations of the method 700 can be performed in a different (e.g., reversed) order compared with the order shown in FIG. 7. Some operations of the method 700 can be performed concurrently with other operations. Some operations can be optional. In some embodiments, a workload-specific device 140 may perform the method 700. The workload-specific device 140 may include an integrated circuit that may perform a workload.

Block 710 may include receiving at least one shared secret 302 provided by a device configuration manager 120 in the cloud computing environment 110. Receiving the at least one shared secret 302 may include a workload-specific device 140 receiving the at least one shared secret 302 from a workload execution environment 130, which may have received the at least one shared secret 420 from the device configuration manager 120, as discussed above. Also as discussed above, the at least one shared secret 302 may include multiple shared secrets 302 that some of the device configuration manager 120, the one or more workload execution environments 130, or the one or more workload-specific devices 140 of the cloud computing environment 110 may rotate.

Block 720 may include generating telemetry data during execution of the integrated circuit. As discussed herein, the workload-specific device 140 may generate the telemetry data. The execution of the integrated circuit of the workload-specific device 140 may include the integrated circuit executing a workload. Block 730 may include encrypting, using the at least one shared secret 302, the telemetry data to form encrypted telemetry data 402. The workload-specific device 140 may encrypt its generated telemetry data. Block 740 may include providing the encrypted telemetry data 402 for storage in the telemetry data store 160 accessible to the device configuration manager 120. As discussed above, providing the encrypted telemetry data 402 may include the workload-specific device 140 sending the encrypted telemetry data 402 to the cloud provider management controller 150 and the cloud provider management controller 150 sending the encrypted telemetry data 402 to the telemetry data store 160.

Block 750 may include receiving encrypted updated configuration data 602. The workload-specific device 140 may receive the encrypted updated configuration data 602. The encrypted updated configuration data 602 may be for the integrated circuit of the workload-specific device 140. Block 760 may include decrypting, using the at least one shared secret 302, the encrypted updated configuration data 602. The workload-specific device 140 may use the at least one shared secret 302 to decrypt the encrypted updated configuration data 602. Block 770 may include applying the decrypted updated configuration data to the integrated circuit to modify operation of the integrated circuit. The workload-specific device 140 may apply the updated configuration data to the integrated circuit, as discussed above.

Figure 8:
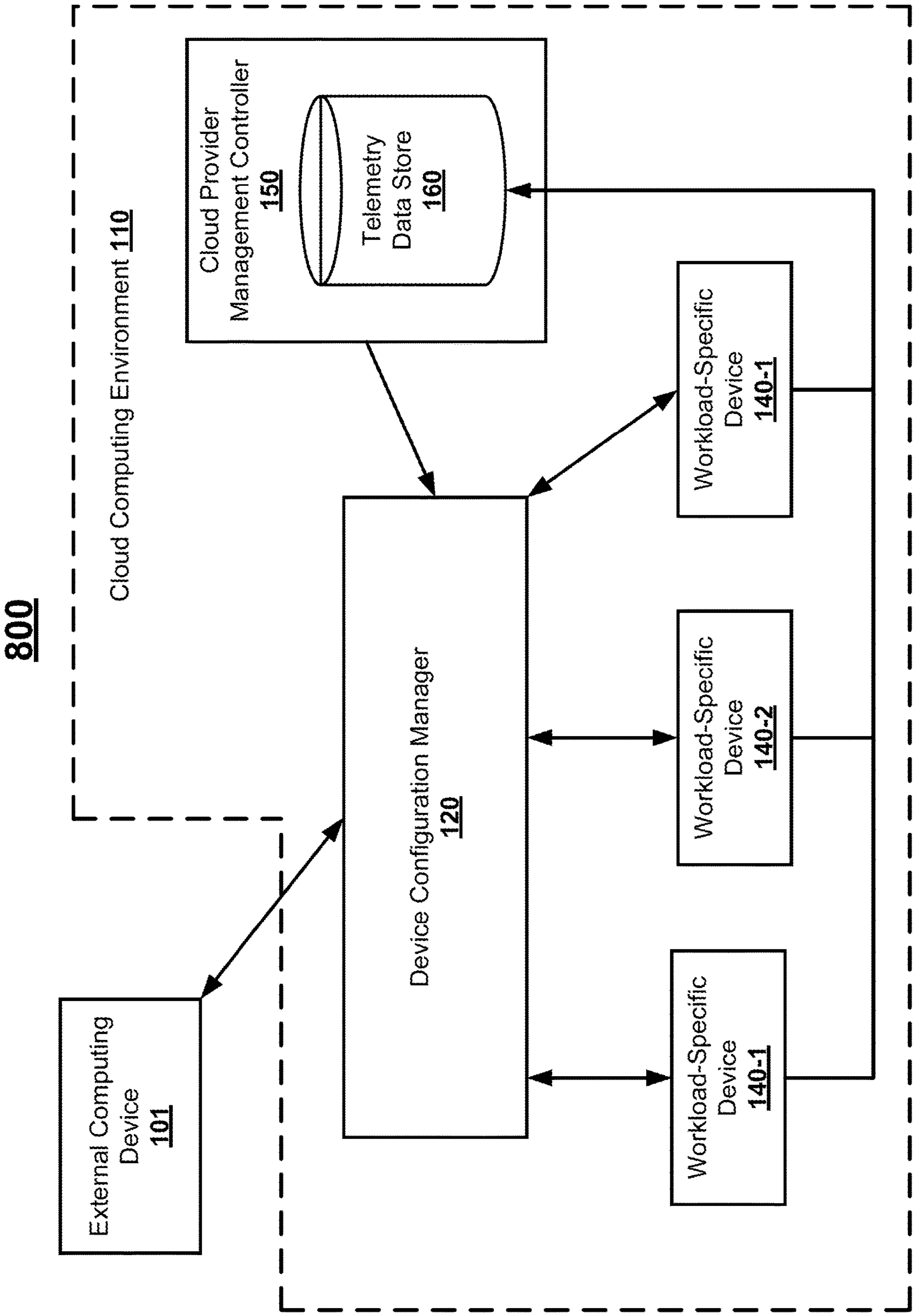
FIG. 8 schematically illustrates another example system that includes a cloud computing environment in which selected aspects of the present disclosure may be implemented, in accordance with various embodiments.

FIG. 8 depicts another example embodiment of a system 800. The system 800 may be similar to the system 100 of FIG. 1. However, certain components of the system 800 may include hardware, software, or functionality that were included in certain components of the system 100. For example, in the system 800, the cloud computing environment 110 may not include a workload execution environment 130. Instead, the device configuration manager 120 may perform the functions of the workload execution environment 130, such as managing the one or more workload-specific devices 140-1, . . . , 140-3; providing a shared secret 302 to the workload-specific devices 140-1, . . . , 140-3; or other functions of the workload execution environment 130. Similarly, the cloud provider management controller 150 may include the telemetry data store 160. In one implementation, the telemetry data store 160 may be physically or logically located on the same computing device as the cloud provider management controller 150. The cloud provider management controller 150 may provide the encrypted telemetry data 402 to the device configuration manager 120.

In some implementations, the cloud provider that provides the cloud computing environment 110 may desire to keep some telemetry data of the one or more workload-specific devices 140-1, . . . , 140-3 confidential from end users. The cloud provider may desire this confidentiality, among other reasons, for some of the same reasons that the end users may desire confidentiality from the cloud provider (e.g., some of the telemetry data may be proprietary information that provides a business advantage). Thus, the cloud provider may utilize some of the same or similar systems, methods, techniques, and technologies as those discussed above to obtain the desired confidentiality.

Figure 9:
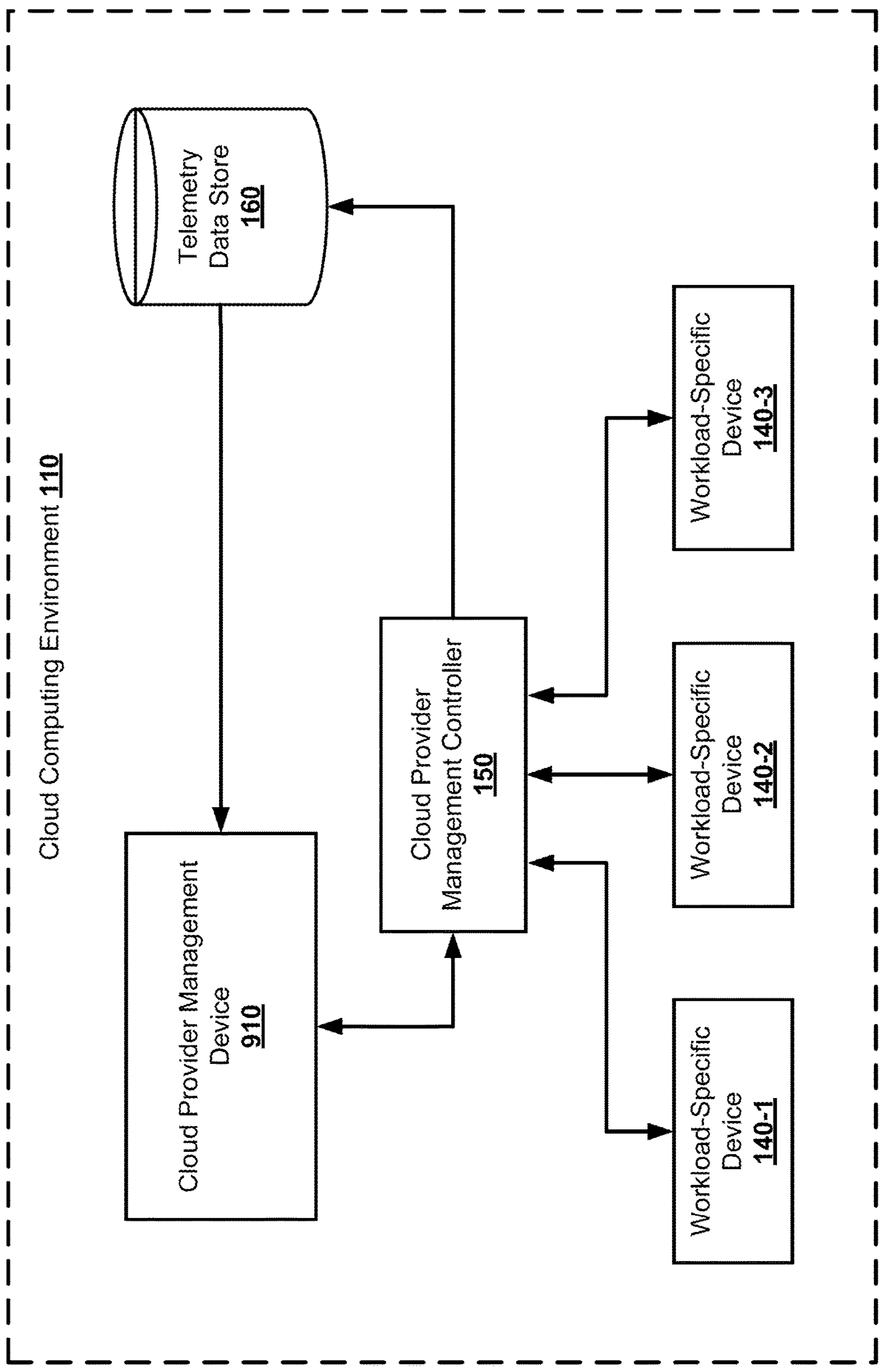
FIG. 9 schematically illustrates another example system that includes a cloud computing environment in which selected aspects of the present disclosure may be implemented, in accordance with various embodiments.

FIG. 9 depicts another example embodiment of a system that may keep some of the telemetry data confidential from end users. The system 900 may be similar to the system 100 of FIG. 1. For example, the system 900 may include a cloud computing environment 110 that includes some of the same components as the system 100, such as one or more workload-specific devices 140-1, . . . , 140-3, the cloud provider management controller 150, or the telemetry data store 160. The cloud computing environment 110 of the system 900 may include other components of the system 100 that are not depicted in FIG. 9 for the sake of simplicity (such as the device configuration manager 120 or the one or more workload execution environments 130-1, 130-2).

In one implementation, the cloud computing environment 110 may include a cloud provider management device 910. The cloud provider management device 910 may include a computing device operated by the cloud provider of the cloud computing environment 110. The cloud provider management device 910 may include a cloud provider shared secret. The cloud provider shared secret may be similar to the shared secret 302 discussed above in relation to FIG. 3. The cloud provider may generate the cloud provider shared secret on the cloud provider management device 910 and send it to the one or more workload-specific devices 140-1, . . . , 140-3, which may include sending the cloud provider shared secret to the cloud provider management controller 150 to send to the one or more workload-specific devices 140-1, . . . , 140-3.

Figure 10:
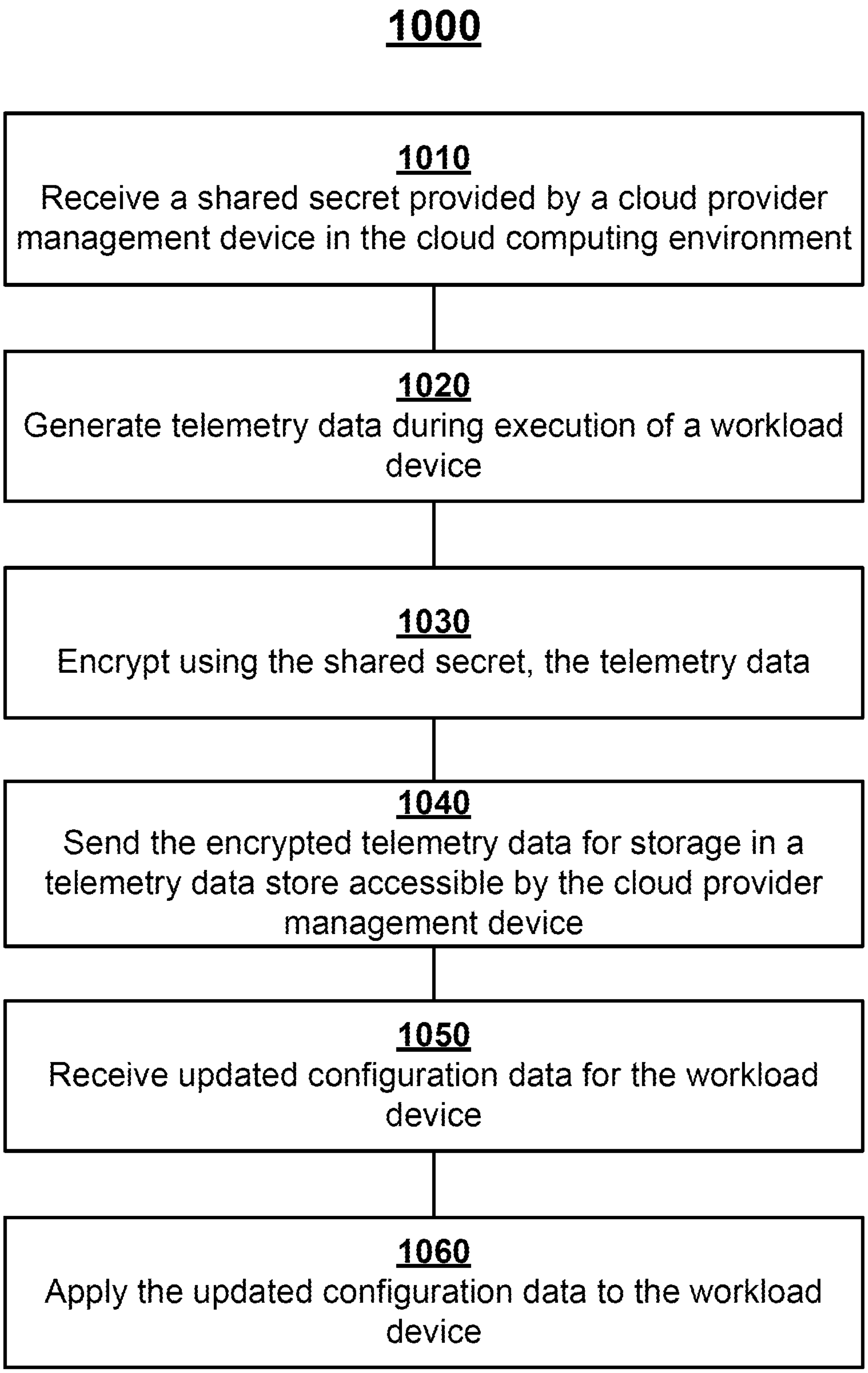
FIG. 10 depicts a flowchart illustrating another example method for practicing selected aspects of the present disclosure.

FIG. 10 is a flowchart illustrating one embodiment of a method 1000 for cloud confidential telemetry export, in accordance with some implementations of the present disclosure. A processing device, having one or more CPUs, one or more GPUs, and/or one or more memory devices communicatively coupled to the CPU(s) and/or GPU(s) can perform the method 1000 and/or each of their individual functions, routines, subroutines, or operations. In certain implementations, a single processing thread can perform the method 1000. Alternatively, two or more processing threads can perform the method 1000, each thread executing one or more individual functions, routines, subroutines, or operations of the methods. In an illustrative example, the processing threads implementing the method 1000 can be synchronized (e.g., using semaphores, critical sections, and/or other thread synchronization mechanisms). Alternatively, the processing threads implementing the method 1000 can be executed asynchronously with respect to each other.

Various operations of the method 1000 can be performed in a different (e.g., reversed) order compared with the order shown in FIG. 10. Some operations of the method 1000 can be performed concurrently with other operations. Some operations can be optional. In some embodiments, a workload-specific device 140 may perform the method 1000. The workload-specific device 140 may include an integrated circuit that may perform a workload.

Block 1010 may include receiving a first shared secret provided by the cloud provider management device 910 in the cloud computing environment 110. As discussed above, the cloud provider management device 910 may receive or generate a cloud provider shared secret. The cloud provider management device 910 may send the cloud provider shared secret to a workload-specific device 140, for example, using an encrypted API call.

Block 1020 may include generating telemetry data during execution of the workload-specific device 140. As discussed above, a workload-specific device 140 may generate telemetry data in response to, for example, executing a workload provided by an end user of the cloud computing environment 110. In some implementations, the workload-specific device 140 may generate telemetry data in response to a command or instruction from the cloud provider. The cloud provider may determine which telemetry data the workload-specific device 140 will expose to end users that utilize the workload-specific device 140 and which telemetry data will be kept confidential from the end users.

In some implementations, a workload-specific device 140 may include a cloud provider confidential computing environment. The cloud provider confidential computing environment may be similar to the confidential computing environment 304 discussed above in relation to FIG. 3. The cloud provider confidential computing environment may include a secure and isolated portion of a processing device that includes hardware or software that prevent external access or external modification of data within the cloud provider confidential computing environment (e.g., by an end user that the cloud provider allows to use the workload-specific device 140). External access or external modification may include access or modification from outside the cloud provider confidential computing environment. Some telemetry data on the workload-specific device within the cloud provider confidential computing environment may be unencrypted, and some telemetry data on the workload-specific device 140 outside the cloud provider confidential computing environment may be encrypted. The encryption/decryption may use an encryption key that is not accessible or known to an end user (e.g., the encryption key is stored in the cloud provider confidential computing environment), and the encryption key may be different for each workload-specific device 140. In some implementations, the workload-specific device 140 may include the confidential computing environment 304 and the cloud provider confidential computing environment simultaneously.

Block 1030 may include encrypting, using the cloud provider shared secret, the telemetry data. The workload-specific device 140 may encrypt some of the generated telemetry data using the cloud provider shared secret while such telemetry data is within the cloud provider confidential computing environment. Block 1040 may include sending the encrypted telemetry data for storage in the telemetry data store 160 accessible by the cloud provider management device 910. Sending the encrypted telemetry data may include the workload-specific device 140 sending the encrypted telemetry data to the cloud provider management controller 150 and the cloud provider management controller 150 sending the encrypted telemetry data to the telemetry data store 160.

The cloud provider management device 910 may receive the encrypted telemetry data from the telemetry data store 160. For example, the telemetry data store 160 may periodically and automatically send the encrypted telemetry data to the cloud provider management device 910, or the cloud provider management device 910 may send a request for the encrypted telemetry data to the telemetry data store 160. The cloud provider management device 910 may use the cloud provider shared secret to decrypt the encrypted telemetry data.

In some implementations, the cloud provider management device 910 may provide at least a portion of the decrypted telemetry data to an end user of the cloud computing environment 110. In some cases, the cloud provider may provide such decrypted telemetry data to an end user in response to the end user purchasing the telemetry data from the cloud provider. The cloud provider management device 910 may provide decrypted telemetry data to the device configuration manager 120. The end user may modify a workload of a workload-specific device 140 based on the telemetry data received from the cloud provider management device 910. In some implementations, the device configuration manager 120 may determine updated configuration data for the workload-specific device based on the telemetry data (similar to the determination of updated configuration data discussed above in relation to block 240 of the method 200 of FIG. 2).

In certain implementations, the cloud provider management device 910 may perform data analysis on the decrypted telemetry data. The cloud provider management device 910 may determine updated configuration data by performing data analysis processes on the telemetry data and generating the updated configuration data based on one or more results of the data analysis. The cloud provider management device 910 may send the updated configuration data to an end user of the cloud computing environment. The cloud provider may do this, for example, in response to an end user purchasing the updated configuration data from the cloud provider.

Block 1050 may include receiving updated configuration data for the workload-specific device 140. The workload-specific device 140 may receive the updated configuration data. In one implementation, the workload-specific device 140 may receive the updated configuration data from the device configuration manager 120. The updated configuration data received from the device configuration manager 120 may be encrypted using the shared secret 302. The workload-specific device 140 may decrypt the encrypted updated configuration data 602 using the shared secret 302. In some cases, the updated configuration data from the device configuration manager 120 may not be encrypted by the shared secret 302 since the end user may have received the updated configuration data from the cloud provider.

In one implementation, the workload-specific device 140 may receive updated configuration data from the cloud provider management device 910. The cloud provider management device 910 may have encrypted the updated configuration data using the cloud provider shared secret. The workload-specific device 140 may decrypt the encrypted updated configuration data using the cloud provider shared secret. In some cases, the updated configuration data from the cloud provider management device 910 may not be encrypted by the cloud provider shared secret since the end user may not be able to access the portion of the workload-specific device 140 that includes the updated configuration data.

Block 1060 may include applying the updated configuration data to the workload-specific device 140 to modify the operation of the workload-specific device 140. Applying the updated configuration data to the workload-specific device 140 may be similar to block 770 of the method 700 of FIG. 7.

Figure 11:
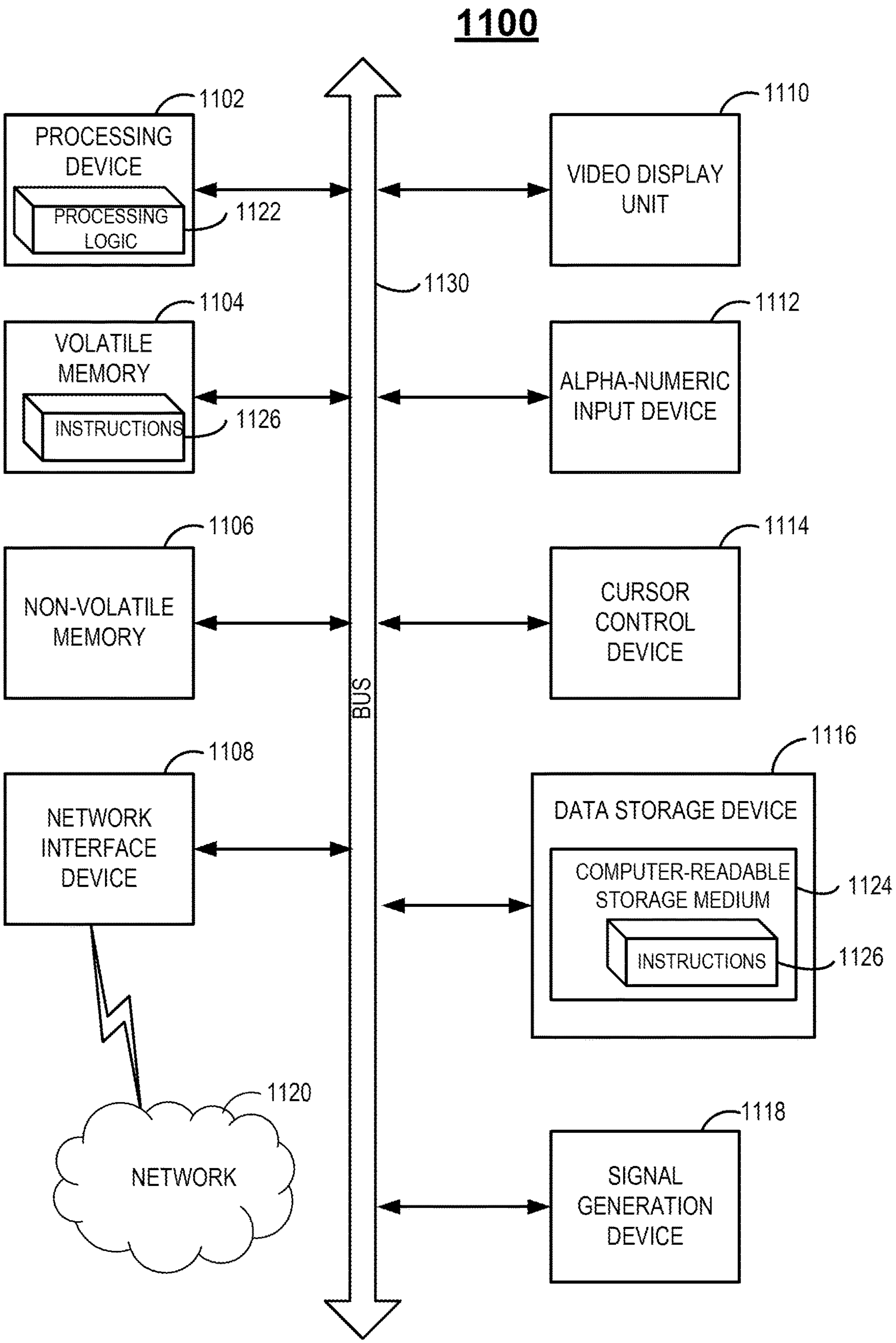
FIG. 11 depicts a block diagram of an example computer device capable of cloud confidential telemetry export, in accordance with some implementations of the present disclosure.

FIG. 11 is a block diagram illustrating an example computer system 1100, in accordance with implementations of the present disclosure. The computer system 1100 can be the device configuration manager 120, a workload-specific device 140, the cloud provider management controller 150, or the telemetry data store 160 in FIG. 1 or FIG. 8, the workload execution environment 130 in FIG. 1, or the cloud provider management device 910 in FIG. 9. The computer system 1100 can operate in the capacity of a server or an endpoint machine in an endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a volatile memory 1104 (e.g., read-only memory (ROM), flash memory, dynamic random access memory (DRAM) such as synchronous DRAM (SDRAM), double data rate (DDR SDRAM), or DRAM (RDRAM), etc.), a non-volatile memory 1106 (e.g., flash memory, static random access memory (SRAM), etc.), and a data storage device 1116, which communicate with each other via a bus 1130.

The processing device 1102 represents one or more general-purpose processing devices such as a microprocessor, CPU, GPU, or the like. More particularly, the processing device 1102 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 can also be one or more special-purpose processing devices such as an ASIC, an FPGA, a digital signal processor (DSP), network processor, or the like. The processing device 1102 is configured to execute instructions 1126 for performing the operations discussed herein (e.g., providing cloud confidential telemetry export).

The computer system 1100 can further include a network interface device 1108. The computer system 1100 also can include a video display unit 1110 (e.g., a liquid crystal display (LCD) or a cathode ray tube (CRT)), an input device 1112 (e.g., a keyboard, and alphanumeric keyboard, a motion sensing input device, touch screen), a cursor control device 1114 (e.g., a mouse), and a signal generation device 1118 (e.g., a speaker).

The data storage device 1116 can include a non-transitory machine-readable storage medium 1124 (also computer-readable storage medium) on which is stored one or more sets of instructions 1126 embodying any one or more of the methodologies or functions described herein. The instructions 1126 can also reside, completely or at least partially, within the volatile memory 1104 and/or within the processing device 1102 during execution thereof by the computer system 1100, the volatile memory 1104 and the processing device 1102 also constituting machine-readable storage media. The instructions 1126 can further be transmitted or received over a network 1120 via the network interface device 1108.

In one implementation, the instructions 1126 include instructions for cloud confidential telemetry export. While the computer-readable storage medium 1124 (machine-readable storage medium) is shown in an example implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "moving", "adjusting", "replacing", "determining", "playing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation," "an implementation," "some implementations," "one embodiment," "an embodiment," or "some embodiments" mean that a particular feature, structure, or characteristic described in connection with the implementation or embodiment is included in at least one implementation or embodiment. Thus, the appearances of the phrase "in one implementation" or "in an implementation" or other similar terms in various places throughout this specification are not necessarily all referring to the same implementation. In addition, the term "or" is intended to mean an inclusive "or" rather than an exclusive "or." Moreover, the word "example" or a similar term are used herein to mean serving as an example, instance, or illustration. Any aspect or design described herein as an "example" is not necessarily to be construed as preferred or advantageous over other aspects or designs. Rather, use of the word "example" or a similar term is intended to present concepts in a concrete fashion.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions; software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A system, comprising:

a first memory; and one or more first processing devices, coupled to the first memory, configured to perform operations comprising:

causing, using an encrypted application programming interface (API) call, a shared secret to be provided to a workload-specific device in a cloud computing environment;

receiving encrypted telemetry data of the workload-specific device, the telemetry data comprising operational metrics of the workload-specific device;

decrypting, using the shared secret, the encrypted telemetry data;

determining, based on the decrypted telemetry data, configuration parameters of the workload-specific device;

generating, using the configuration parameters of the workload-specific device, updated configuration data for the workload-specific device, the updated configuration data comprising at least one of a memory timing setting of the workload-specific device or a clock setting of the workload-specific device; and causing the updated configuration data in an encrypted state to be provided to the workload-specific device, wherein the updated configuration data, when in a decrypted state, is applicable to the workload-specific device to modify at least one of a memory timing of the workload-specific device or a clock of the workload-specific device.

2. The system of claim 1, wherein at least a portion of the one or more first processing devices are part of a first confidential computing environment that prevents external modification of data within the first confidential computing environment.

3. The system of claim 1, wherein:
the workload-specific device comprises a second confidential computing environment including at least a portion of one or more second processing devices, and
the second confidential computing environment prevents external modification of data within the second confidential computing environment.

4. The system of claim 1, wherein the operational metrics of the workload-specific device comprise at least one of:
computing resource utilization data of the workload-specific device;
a data path of the workload-specific device;
an error generated by the workload-specific device; or
a cache line miss of the workload-specific device.

5. The system of claim 1, wherein the workload-specific device comprises at least one of:
an application-specific integrated circuit (ASIC);
a field-programmable gate array (FPGA);
a graphics processing unit (GPU); or
a central processing unit (CPU).

6. The system of claim 1, wherein determining the configuration parameters of the workload-specific device further comprises:
performing data analysis on the telemetry data.

7. The system of claim 1, wherein the encrypted telemetry data is not decryptable by a cloud provider of the cloud computing environment.

8. The system of claim 7, wherein the operations further comprise:
determining one or more portions of the telemetry data that are below a threshold level of sensitivity; and
providing the one or more portions of the telemetry data in a decrypted state for access by the cloud provider of the cloud computing environment.

9. The system of claim 1, wherein the operations further comprise receiving the shared secret from a computing device, wherein:
the computing device is external to the cloud computing environment; and
receiving the shared secret from the computing device comprises using a second encrypted API call.

10. The system of claim 1, further comprising a virtualized component that includes the first memory and the one or more first processing devices, wherein the virtualized component comprises at least one of a virtual machine (VM) or a container.

11. A system, comprising:
an integrated circuit;
a memory; and
one or more processing devices, coupled to the memory, configured to perform operations comprising:
receiving at least one shared secret provided by a device configuration manager in a cloud computing environment via an encrypted application programming interface (API) call;
generating telemetry data during execution of the integrated circuit, the telemetry data comprising operational metrics of the integrated circuit;
encrypting, using the at least one shared secret, the telemetry data;
providing the encrypted telemetry data for storage in a telemetry data store accessible to the device configuration manager;
receiving encrypted updated configuration data generated by the device configuration manager for the integrated circuit based on the encrypted telemetry data, the updated configuration data comprising configuration parameters of the integrated circuit, the configuration parameters comprising at least one of a memory timing setting of the integrated circuit or a clock setting of the integrated circuit;
decrypting, using the at least one shared secret, the updated configuration data; and
applying the decrypted updated configuration data to the integrated circuit to modify at least one of a memory timing of the integrated circuit or a clock of the integrated circuit.

12. The system of claim 11, wherein:
the integrated circuit comprises a portion of an artificial intelligence (AI) model; and
the execution of the integrated circuit comprises operating the AI model.

13. The system of claim 11, wherein the operational metrics of the integrated circuit comprise at least one of:
microprocessor usage data and memory usage data of the integrated circuit;
a temperature reading of the integrated circuit; or
a power consumption reading of the integrated circuit.

14. The system of claim 11, wherein:
the at least one shared secret comprises a plurality of shared secrets; and
using the at least one shared secret comprises using a currently selected shared secret of the plurality of shared secrets.

15. The system of claim 14, wherein the operations further comprise periodically rotating the currently selected shared secret among the plurality of shared secrets.

16. A method, comprising:
receiving a first shared secret provided by a cloud provider management device in a cloud computing environment via an encrypted application programming interface (API) call;
generating telemetry data during execution of a workload-specific device, the telemetry data comprising operational metrics of the workload-specific device;
encrypting, using the first shared secret, the telemetry data;
providing the encrypted telemetry data for storage in a telemetry data store accessible by the cloud provider management device;
decrypting, using the first shared secret, the encrypted telemetry data;
receiving updated configuration data for the workload-specific device generated based on the decrypted telemetry data, the updated configuration data comprising configuration parameters of the workload-specific device, the configuration parameters comprising at least one of a memory timing setting of the workload-specific device or a clock setting of the workload-specific device; and
applying the updated configuration data to the workload-specific device to modify at least one of a memory timing of the workload-specific device or a clock of the workload-specific device.

17. The method of claim 16, wherein:
the method further comprises receiving, at the workload-specific device and from a device configuration manager, a second shared secret;
receiving the updated configuration data comprises receiving encrypted updated configuration data from the device configuration manager; and
the method further comprises decrypting the encrypted updated configuration data using the second shared secret.

18. The method of claim 17, wherein:

at least a first portion of the workload-specific device is part of a first confidential computing environment that prevents modification of data within the first confidential computing environment, wherein the first confidential computing environment comprises the first shared secret; and at least a second portion of the workload-specific device is part of a second confidential computing environment that prevents modification of data within the second confidential computing environment, wherein the second confidential computing environment comprises the second shared secret.

19. The method of claim 16, wherein the operational metrics of the workload-specific device comprise at least one of:

a clock setting of the workload-specific device;

a voltage of the workload-specific device; or a utilization counter of the workload-specific device.

* * * * *